United States Patent [19]

Di Santo et al.

[11] Patent Number: 5,459,776
[45] Date of Patent: * Oct. 17, 1995

[54] DATA/FACSIMILE TELEPHONE SUBSET APPARATUS INCORPORATING ELECTROPHORETIC DISPLAYS

[75] Inventors: Frank J. Di Santo, North Hills; Denis A. Krusos, Lloyd Harbor, both of N.Y.

[73] Assignee: Copytele, Inc., Huntington Station, N.Y.

[*] Notice: The portion of the term of this patent subsequent to Sep. 26, 2006 has been disclaimed.

[21] Appl. No.: 184,852

[22] Filed: Jan. 21, 1994

Related U.S. Application Data

[63] Continuation of Ser. No. 905,154, Jun. 25, 1992, abandoned, which is a continuation of Ser. No. 704,901, May 21, 1991, abandoned, which is a continuation of Ser. No. 367,845, Jun. 19, 1989, abandoned, which is a continuation of Ser. No. 93,374, Sep. 4, 1987, Pat. No. 4,870,677.

[51] Int. Cl.⁶ .......................... H04M 11/00; G06F 7/58; H03M 11/04; G09G 3/20
[52] U.S. Cl. .......................... 379/96; 340/825.3; 341/23; 345/173
[58] Field of Search .......................... 345/180, 168, 345/173, 16, 113, 107; 348/15; 358/85, 300, 471, 479, 442, 426, 400, 448, 452; 341/23, 34; 340/825.3, 825.31, 825.81; 379/53, 54, 96, 100, 94, 355, 364; 204/299 R; 235/462

[56] References Cited

U.S. PATENT DOCUMENTS

| | | | |
|---|---|---|---|
| 3,752,912 | 8/1973 | Ohsawa et al. | 358/426 |
| 3,879,722 | 4/1975 | Knowlton | 341/23 |
| 3,956,745 | 5/1976 | Ellis | 341/23 |
| 3,972,040 | 7/1976 | Hilsum et al. | 340/825.81 |
| 4,313,108 | 1/1982 | Yoshida | 341/23 |
| 4,322,754 | 3/1982 | Mason | 235/462 |
| 4,332,464 | 6/1982 | Bartulis et al. | 340/707 |
| 4,333,090 | 6/1982 | Hirsch | 340/825.3 |
| 4,354,265 | 10/1982 | Nyberg et al. | 379/96 |
| 4,479,112 | 10/1984 | Hirsch | 340/825.3 |
| 4,502,048 | 2/1985 | Rehm | 340/825.31 |
| 4,520,391 | 5/1985 | Edgar et al. | 358/133 |
| 4,607,289 | 8/1986 | Kurokawa | 379/100 |
| 4,633,326 | 12/1986 | Endoh et al. | 358/442 |
| 4,640,989 | 2/1987 | Riner et al. | 379/96 |
| 4,644,326 | 2/1987 | Villalobos et al. | 341/34 |
| 4,652,933 | 3/1987 | Koshiishi | 358/426 |
| 4,653,086 | 3/1987 | Laube | 379/96 |
| 4,655,897 | 4/1987 | SiSanto | 350/267 |
| 4,656,623 | 4/1987 | Dalby, Jr. et al. | 379/94 |
| 4,688,108 | 8/1987 | Cotton et al. | 358/261.1 |
| 4,709,387 | 11/1987 | Masuda | 340/712 |

(List continued on next page.)

FOREIGN PATENT DOCUMENTS 60-134554   7/1985   Japan ..................... 379/100

*Primary Examiner*—Alyssa H. Bowler
*Assistant Examiner*—Mark H. Rinehart
*Attorney, Agent, or Firm*—Arthur L. Plevy

[57] ABSTRACT

There is disclosed a telephone subset which incorporates a high resolution electrophoretic display on the surface of a subset housing. The telephone subset includes a microprocessor which operates under the control of a mode selector. In this manner the display is employed to generate various keyboard formats and operates in conjunction with a position sensitive overlay to enable a subscriber to place telephone calls in a conventional manner when the keyboard display is implemented on the electrophoretic display. The telephone subset in conjunction with various subset buttons which control the mode selector is capable of operating in different modes. Due to the high resolution and large capacity of the display one can now present pages of stored telephone numbers which essentially enables a user to select any number by means of a movable cursor and by pressing another subset button can immediately dial that number. Other modes provide credit card storage which are accessible and displayed as well as other privacy operative modes which are implemented by means of the high resolution display, microprocessor and associated circuitry.

19 Claims, 4 Drawing Sheets

U.S. PATENT DOCUMENTS

| | | | |
|---|---|---|---|
| 4,752,808 | 7/1988 | Lemelson | 358/300 |
| 4,816,911 | 3/1989 | Kirsch et al. | 358/400 |
| 4,827,085 | 5/1989 | Yaniv et al. | 379/96 |
| 4,827,349 | 5/1989 | Ogata et al. | 358/434 |
| 4,849,815 | 7/1989 | Strek | 358/471 |
| 4,857,914 | 8/1989 | Thrower | 341/23 |
| 4,870,677 | 9/1989 | Di Santo et al. | 340/712 |
| 4,885,580 | 12/1989 | Noto et al. | 340/711 |
| 4,989,238 | 1/1991 | Iggulden et al. | 358/444 |
| 4,996,707 | 2/1991 | O'Malley et al. | 379/100 |
| 5,008,929 | 4/1991 | Guichard et al. | 379/53 |
| 5,036,513 | 7/1991 | Greenblatt | 358/85 |
| 5,040,232 | 8/1991 | Kanno | 382/65 |

DATA/FACSIMILE TELEPHONE SUBSET APPARATUS INCORPORATING ELECTROPHORETIC DISPLAYS

This is a continuation of application Ser. No. 07/905,154, filed on Jun. 25, 1992, now abandoned, entitled *Data/Facsimile Telephone Subset Apparatus Incorporating Electrophoretic Displays* which is a continuation of 07/704,901 filed on May 21, 1991, now abandoned, which is a continuation of 07/367,845 filed on Jun. 19, 1989, now abandoned which is a continuation of 07/093,374 filed on Sep. 4, 1987 and now U.S. Pat. No. 4,870,677.

BACKGROUND OF THE INVENTION

This invention relates generally to a telephone subset and more particularly to a data/facsimile telephone subset which employs a high resolution electrophoretic display.

In the present technology there are many telephones or subsets which are available, which phones are associated with various display devices. Many telephones incorporate LCD displays which can, for example, display the time of day, the date, as well as the telephone number which is dialed. Certain of these displays will also give an indication of how long the conversation lasts by providing a timing means which is also viewable on the display. Such telephones or subsets, which are available from many sources, are widely employed in present day use and essentially the display normally consists of a line of data such as, for example, the displays can display a telephone number as a single telephone number or may display a date and time of day. There are other telephone subsets which are available at airports, motels and so on and which have a more complete display as, for example, a CRT display or a gas discharge display.

These telephones can be employed for many different purposes and provide a consumer or a caller with visual data allowing him to coact with the telephone subset or with the telephone company through the data displayed. Hence, it is apparent that the prior art is replete with telephone subsets of various sorts which include various displays.

Recently, the assignee herein, namely, Copytele of Huntington Station, has developed and demonstrated a high resolution electrophoretic display which display is extremely thin and has the capability of providing a large number of lines to provide excellent resolution. For an example of such a display, reference is made to U.S. Pat. No. 4,655,897 which issued on Apr. 7, 1987 to Frank J DiSanto and Denis A. Krusos and entitled "Electrophoretic Display Panels and Associated Methods". The patent discloses an electrophoretic display apparatus which includes a planar transparent member having disposed on a surface a plurality of vertical conductive lines to form a grid of lines in the Y direction. On top of the grid of vertical lines there is disposed a plurality of horizontal lines which are positioned above the vertical lines and insulated therefrom by a thin insulating layer at each of the intersection points. Spaced above the horizontal and vertical line pattern is a conductive plate. The space between the conductive plate and the X and Y line patterns is filled in with an electrophoretic dispersion containing chargeable pigment particles. When a voltage is impressed between the X and Y lines pigment particles, which are located in wells or depressions between the X and Y pattern, are caused to migrate towards the conductive plate and are deposited upon the conductive plate in accordance with the bias applied to the X and Y line conductors. There is described various electrophoretic dispersions which are suitable for operating with the display, as well as techniques for fabricating the display. In this manner such displays can be fabricated to contain large effective display surfaces while being relatively thin and which are capable of high resolution at very low power.

It is an object of the present invention to provide a unique telephone subset which incorporates, on a major surface thereof, an electrophoretic display as the type described in U.S. Pat. No. 4,655,897.

It is a further object to provide an improved data telephone subset which can be employed for various purposes due to the high resolution electrophoretic display associated therewith.

BRIEF DESCRIPTION OF THE PREFERRED EMBODIMENT

A telephone subset apparatus for use in providing high quality data displays, comprising a telephone subset including a housing having a telephone handset coupled thereto, a high resolution display panel means mounted on said top surface of said housing and capable of being accessed by an X-Y addressing means to display graphic data in a plurality of lines, microprocessor means coupled to said display panel and operative to cause said panel to provide a graphic presentation of a telephone keyboard arrangement according to said X-Y addressing means, position sensitive means coupled to said panel and operative when accessed to produce a telephone number output signal as dialed by a user employing said graphic keyboard presentation as a guide for selecting said number.

DETAILED DESCRIPTION OF THE INVENTION

Figure 1:
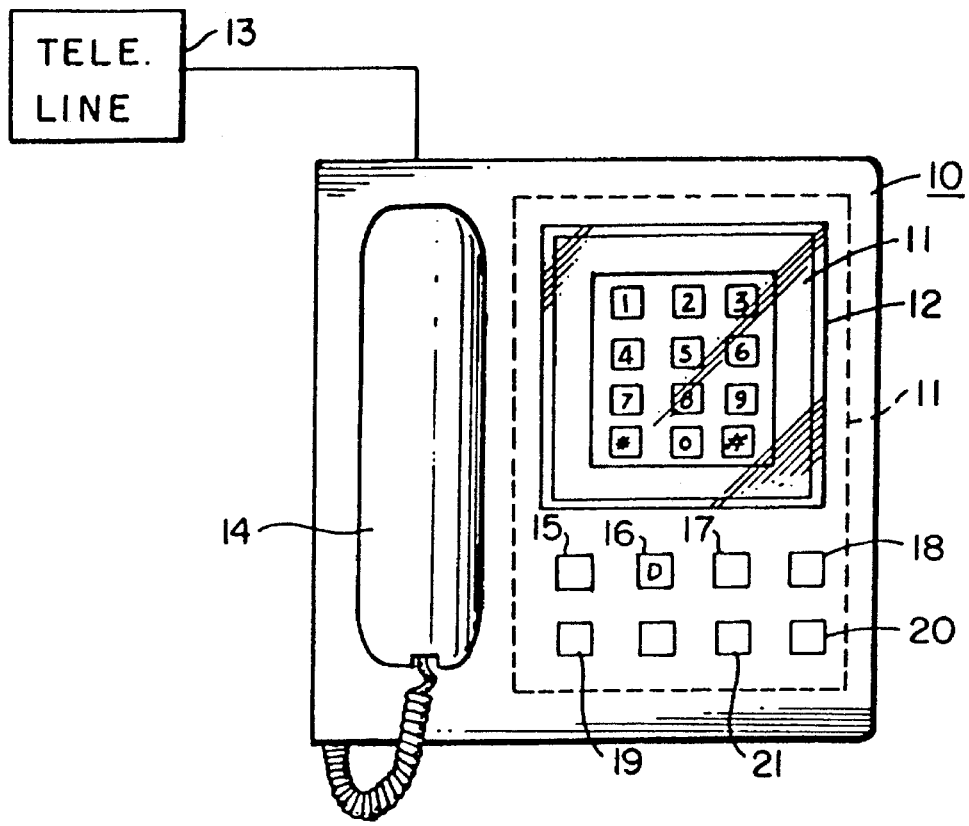
FIG. 1 is a top plan view of a telephone subset having an electrophoretic display according to this invention.

Referring to FIG. 1 there is shown a telephone subset 10 which includes a handset 14 normally including a transmitter and receiver portion. Essentially, the entire mechanism for the subset, including the transmitter and receiving portion, as well as the various circuitry to activate ringing and so on, are well known functions and are available with many different subsets of the prior art. The subset 10 as including the above components is an operational telephone which can be directly connected to a telephone line 13.

As one can ascertain from FIG. 1, the subset 10 has located on the front surface thereof an electrophoretic display 11. The display 11 may be fairly large in effective area and, for example, may be four inches by four inches or more. It is, of course, understood that the display 11 can be rectangular, square or of any geometrical configuration of adequate size. The electrophoretic display 11 is accessed, as indicated above, by means of an XY matrix and is capable of providing high resolution with a relatively large number of data lines. The display 11 is associated with an overlay 12. The overlay 12 may be a pressure or position sensitive device which, as will be explained, enables the user of the subset to implement the dialing sequence when a call is to be made. Also associated with the subset 10 are a series of mode key switches or momentary push buttons, as 15–21, which as will be explained are utilized to implement operating modes associated with the subset employing the high resolution electrophoretic display 11. The key switches can also be directly displayed on the display 11 and operate with the overlay 12 as compared to discrete keys. Hence, one such key 100 is shown by way of example in FIGS. 2 and 3. Therefore, the entire top surface of the subset housing can be a display panel only (dashed line of FIG. 1).

The main aspect of using the display 11 in conjunction with the subset 10 is to enable a user to dial various numbers and to receive data from called locations, which data can be read directly from the display. In this manner the user can utilize the subset 10 as a means for receiving graphical data or other data from various remote locations which data will be immediately displayed on the display 11 associated with the subset. It is, of course, apparent that apart from receiving data one must be able to initiate a call and utilize the subset 10 as a conventional telephone.

Figure 2:
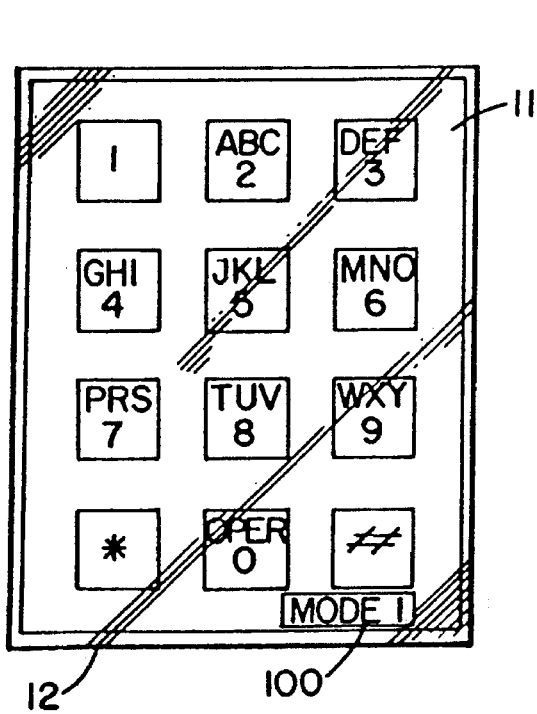
FIG. 2 a diagram depicting a particular type of graphic keyboard format which can be employed in conjunction with the subset of FIG. 1.

Essentially, as shown in FIG. 1, there is displayed on the subset, via the display 11, a replica of a conventional dialing keyboard. More particularly, FIG. 2 shows the conventional keyboard. As will be further explained, this keyboard format is generated by a microprocessor means utilizing CAD techniques whereby when a subscriber goes off hook the keyboard format is displayed. In conjunction with the pressure or position sensitive overlay 12, the user can now dial in any number desired. It is immediately understood that while a pressure sensitive overlay is described, there are many other techniques which will allow a touch overlay or touch operation, such as LED arrays or capacitive sensing devices. These devices will detect the position or pressure imparted by a user at various areas of the display, and hence, such an overlay is not directed solely to pressure.

In regard to pressure overlays, they are furnished by many companies and are conventional components. See, for example, a product distributed by Tektronix Inc. of Beaverton, Oregon, which product is marketed as an interactive touch panel. The panel essentially is capable of detecting touch or pressure with high resolution. It is rugged and reliable and of relatively low cost. Other companies, such as Hewlett Packard of California, produce systems which are designated as touch screen systems. Thus, as one can ascertain, there are many overlays, as overlay 12, which can be associated with various display panels to enable a user to implement a code or other sequence by touching an area of a screen which has been displayed.

Thus, in referring to FIG. 2 there is shown a typical telephone keyboard format which, as will be explained, is presented on the display 11 and which immediately becomes visible to the user. Thus, the user can essentially place a call by accessing the various display areas which will produce discrete signals generated by touching the various positions to enable a user to dial in a conventional manner. As indicated, FIG. 2 shows the conventional telephone keyboard of which we are all apprised of. This keyboard format, as will be explained, is generated by a microprocessor whereby when a subscriber goes off hook or desires to place a call, the keyboard format, as shown in FIG. 2, would be displayed.

Figure 3:
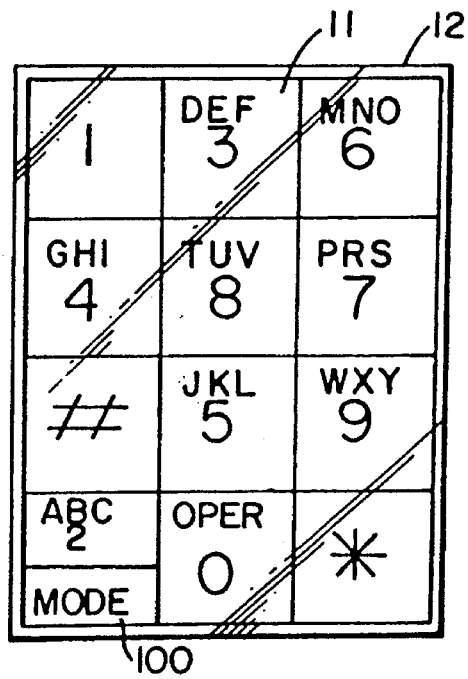
FIG. 3 is a schematic diagram depicting another type of graphic keyboard format.

Referring to FIG. 3 there is shown another replica of a telephone keyboard. It is immediately noted that the numbers, as for example compared to FIG. 2, are out of order or out of sequence. In any event, as will be further explained, the ability to generate a graphic keyboard format on a display, as electrophoretic display 11, enables one to easily exchange the various positions associated with a conventional keyboard. In this manner the display 11 can generate a random format indicative of a telephone keyboard where the user can view the format and dial a number in complete secrecy. This aspect can, therefore, enable high security dialing.

As one can ascertain, there are many people who are extremely competent in determining a number dialed by a person. These people can view a person making a call from a remote location and obtain the exact number dialed by viewing the sequence of dialing as implemented on a conventional telephone keyboard. In this manner, such persons have received unauthorized codes from watching a user dial in a secure number, such as a credit card number. These codes, for example, may also include MCI, Sprint or other access codes, as well as credit card numbers, to which an unauthorized user, by viewing the person dialing, may gain access.

Based on the generation of a display indicative of a keyboard, by means of electronic techniques, one can therefore randomly exchange the conventional key positions on the keyboard display as shown, for example, in FIG. 3. Thus, this will prevent unauthorized persons from ever knowing or determining the numbers dialed due to the random nature of the keyboard display, as generated by the circuitry to be described.

Thus, as one can further ascertain, FIG. 2 shows a completely conventional keyboard which is generated and displayed on the electrophoretic display 11, while FIG. 3 shows a random arrangement of another keyboard format which can also be utilized to generate dialing pulses indicative of a telephone call.

Apart from the above described mode of operation, another mode of operation will be described when viewing FIG. 5. It is well known that modern day telephone subsets have capacity for storage in memory of a plurality of telephone numbers. Most subsets can store 10 to 15 individual numbers or more, each of which may include eleven or more digits. These telephone numbers are associated with a directory that the user himself can formulate. In this manner modern telephone subsets enable a user to dial in and store a series of frequently called numbers. These numbers can then be dialed by merely pressing one button instead of dialing the entire sequence. In certain subsets the user would dial in, for example, two digits to access an 11 digit number. Such procedures and structures for implementing such subsets are well known. In fact, many of the circuits, as well as the techniques for implementing automatic dialing for a telephone subset, are available from many sources of manufacture. See, for example, U.S. Pat. No. 4,011,414 issued on Mar. 8, 1977, entitled "Automatic Dial System for a Subscriber Telephone" to W. D. Warren and assigned to Texas Instrument Incorporated of Dallas, Tex. This is one of many companies who supply such automatic dialing systems as well as complete integrated circuits for use in telephone subsets.

As will be explained, by utilizing a telephone subset with an electrophoretic display, as display 11, one can now substantially increase the number of stored telephone numbers as the consumer need no longer rely on memory or rely on a separate written directory for determining what numbers are stored in the system. As will be explained, the display, as shown in FIG. 5, is effectively capable of displaying a plurality of stored numbers, including the name of the individual or company associated with that number. In this manner a cursor (FIG. 5) is also presented whereby the cursor can move along the listing and when the subscriber moves the cursor to the number he desires to call he can now activate or access the call by pressing a further button, such as button 21 on the subset. When the cursor is aligned at a particular telephone number the activation of button 21 causes the telephone circuitry to automatically dial the number at the cursor position. This, therefore, enables one to store hundreds of telephone numbers in local memory and to display all numbers stored. Then, by means of the cursor, the subscriber can select any one of the numbers stored and thereby immediately commence dialing.

It is further indicated that the user can rapidly scan the directory, or the telephone numbers as stored, by means of additional keys such as 17 and 18 and, hence, have rapid access to all numbers which are stored and displayed on the electrophoretic display 11 in order to initiate a dialing sequence or, for example, to look up or determine a certain number. Thus, as one can ascertain, the use of a high resolution, multiline display in conjunction with a subset will enable a user to access a large number of telephone numbers or other data. By use of the display each number will be associated with a particular company or individual to thereby enable such a user to commence a rapid dialing sequence without any further access to the telephone keyboard. The directory consists of multiple data pages where each page can be addressed by means of a mode key on the subset. Hence, a listing of hundreds of telephone numbers displayed as 50 or more at one time is accommodated.

Figure 4:
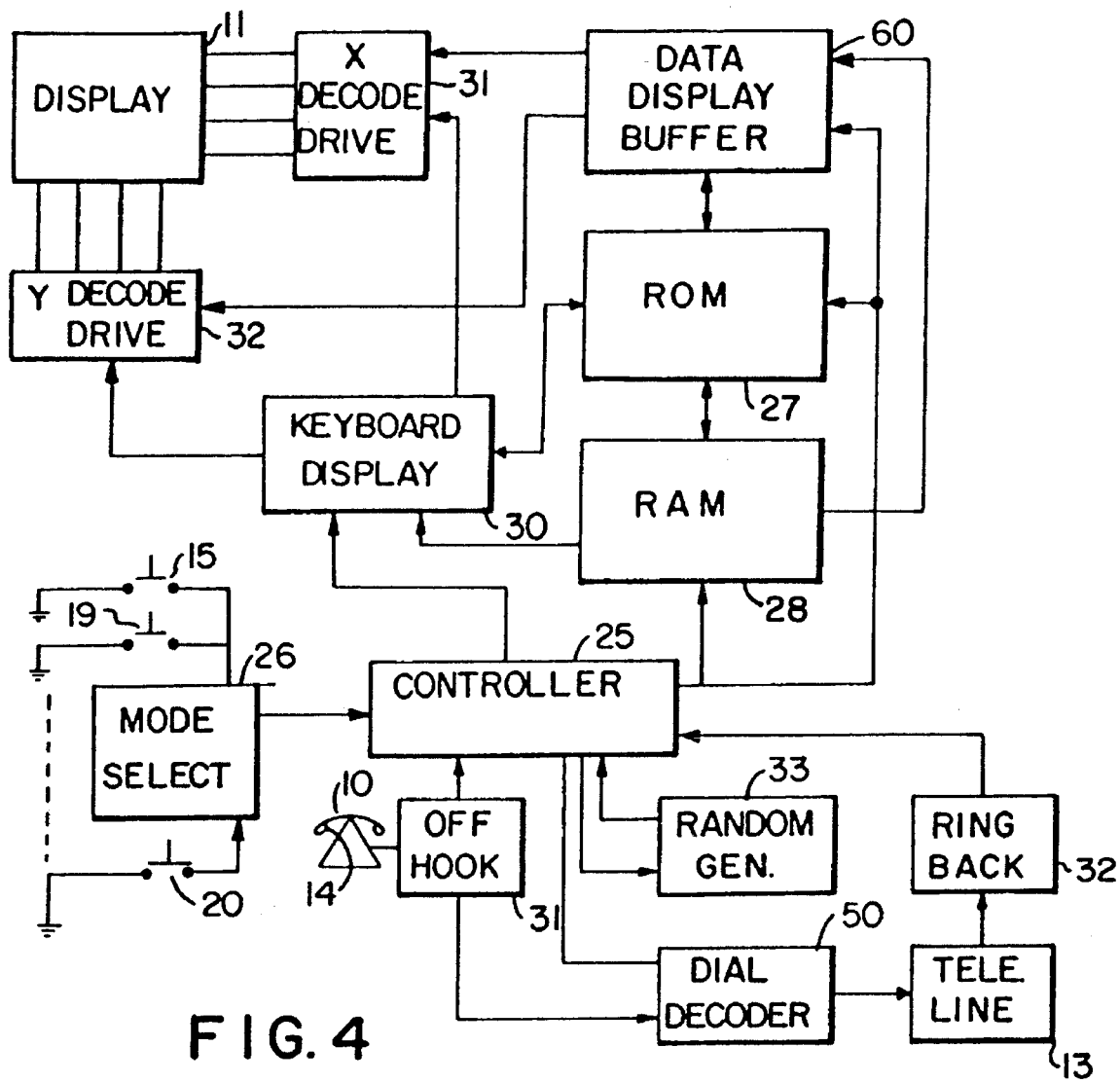
FIG. 4 is a block diagram showing a telephone subset operating in conjunction with a display according to this invention.

Referring to FIG. 4, there is shown a detailed block diagram of the circuitry included within the telephone subset, such as subset 10 of FIG. 1. The telephone subset includes a controller or microprocessor 25. As one can ascertain, in today's technology there are many very powerful microprocessors which are commercially available. Certain microprocessors, for example, are capable of processing 32 bit words and are manufactured by many companies. See, for example, the microprocessor manufactured by Intel, Inc. as the 80386. The Motorola Corporation manufactures a microprocessor designated as the 68020 while the Zilog Company manufactures a microprocessor designated as the Z80000CPU. For further examples of suitable microprocessors, reference is made to a text entitled "32-bit Microprocessors" by H. J. Mitchell, published by the McGraw Hill Book Company (1986). In that text there is not only shown the structure of such microprocessors or controllers 25 but many of the applications associated with such devices.

The microprocessor or controller 25 is coupled to a mode selector module 26 which mode selector module interfaces with certain of the buttons or keys, as 15–20, associated with the telephone subset of FIG. 1. The mode selector 26, as will be further explained, can be implemented by programming the microprocessor in a well known manner.

In any event, the microprocessor 25 is typically associated with a random access memory or RAM 28 and a read only memory or ROM 27. Stored in the ROM are XY patterns indicative of a particular keyboard format, such as the keyboard shown in FIGS. 2 or 3 as well as others. The output of the ROM and RAM are coupled to a keyboard display module 30 which, essentially, controls an X decode and driver module 31 and a Y decode and driver module 32.

As indicated above, the display 11, which is an electrophoretic display, is addressed by means of an XY matrix arrangement. This is a common access technique for many memory and display devices. Thus, as one can ascertain, the X and Y decode and driver modules 31 and 32 are coupled to suitable terminals of the electrophoretic display 11. Hence, by the use of XY addressing, one can generate any type of display on the display 11 which will be visualized by the user.

As will be further explained, when the user implements a call he normally takes the handset 14 and places it in an off hook condition. This off hook condition is detected by means of an off hook detector 31 which, therefore, indicates to the controller or microprocessor 25 that a call is to be made. The controller 25 then accesses the suitable memory addresses of the ROM and RAM and displays the keyboard format shown in FIG. 2, for example. This, of course, is a conventional keyboard display. The keyboard format is, therefore, visually displayed to the user and, as indicated above, is associated with a position or pressure sensitive transparent overlay 12. Thus, the user then, by accessing the various areas of the display, can dial a number in a conventional manner. The ,exact dialing technique, and so on, will be explained subsequently.

In any event, if the user desires a high security mode, in which a random keyboard portrayal is to be provided, he may then activate access button 20 informing the mode selector to activate a random generator sequence indicative of module 32. In any event, one can generate a display, as for example shown in FIG. 3, by means of utilizing a random generator to randomly place the digits 0 to 9 in any location on the graphic keyboard display. However, it is also understood that a certain number of keyboard formats can be directly stored in ROM memory 27 and, hence, the user would have access, for example, to five different keyboards and by pressing key 20 any one of the different five keyboard would randomly appear. In any event, this will again allow the user to commence a dialing sequence. Such a random generator format is associated with ROM and RAM memory locations to enable the keyboard display 30 to present the format shown in FIG. 3 or any other format. The dialing sequence is decoded by the dial decoder 50 which is controlled by the microprocessor 25 according to the displayed graphic keyboard format.

Actually, the user will commence a dialing sequence which, essentially, would allow the telephone switching system to gain access to the dialed number. The system detects a ring back via the ring back detector 32 to thereby extinguish the display of the keyboard format to ready the subset display 11 for receiving data, if that is desired. In any event, if the user does not wish the display to be erased then the user can indicate this by pressing a save button also associated with the subset. There is also shown a data display buffer 60 which will be explained.

Figure 6:
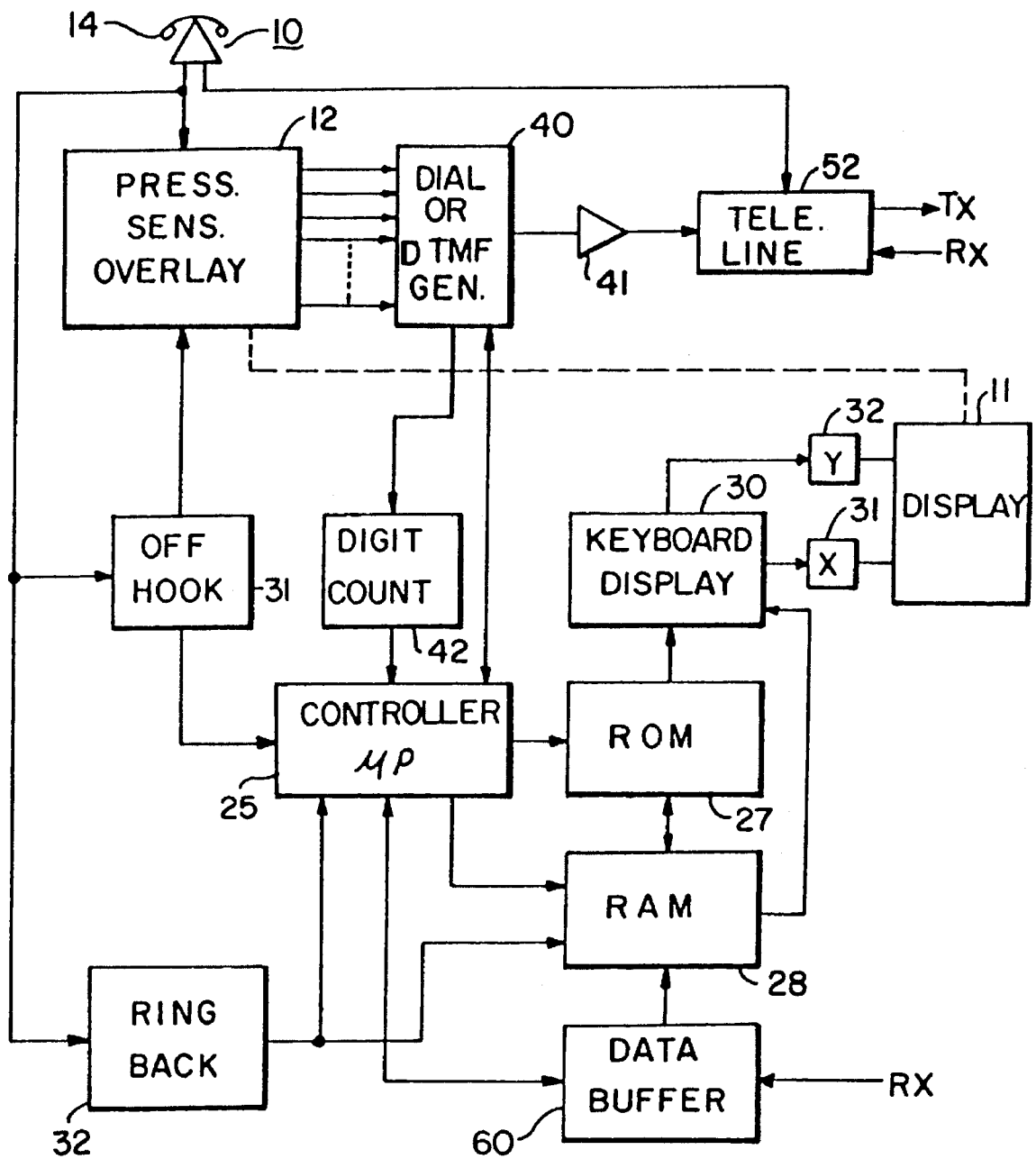
FIG. 6 is a detailed block diagram depicting the operation of the subset according to this invention.

FIG. 6 shows a block diagram indicating the further implementation of the various features, as described above. Essentially, the subset 10 may be associated with a pressure sensitive overlay 12 or any other type of touch or position overlay, as is well known in the art. The overlay 12 is coupled to a dial or TTMF generator 40 which includes dial decoder circuitry 50 of FIG. 4. The dial or DTMF generator 40 is a well known module and is available from many companies in integrated circuit form. The generator 40 converts the various switch positions associated with the display 11 to suitable frequencies or dial pulses to be transmitted over the telephone line 52 by means of conventional circuitry including the buffer or isolation amplifier 41. The dial or DTMF generator 40 includes a digit counter 42 coupled to the microprocessor 25 to determine each digit dialed for providing the proper timing. This is also well known. The telephone line is normally associated with a suitable buffer, which is available from many sources as well. The buffer (not shown) may contain storage and other suitable devices enabling one to transmit stored telephone numbers and thereby transmit the same over the conventional transmit or tip (TX) and receive or ring (RX) lines associated with the telephone line.

Also shown in FIG. 6 is the fact that the receive line RX is associated with a separate data buffer designated by reference numeral 60 and also shown in FIG. 4. The function of the data buffer 60 is to store incoming data and to direct the data to the RAM 28 or other memory sections of the microprocessor or controller 25. It is, of course, understood that such microprocessors can receive multiple inputs from various devices on real time input/output (I/O) buses. The microprocessor, as programmed, will then determine the nature of the data, as stored in data buffer 60, in order to properly activate the keyboard display 11 to enable the display of the proper data and to decode the data according to the incoming data format. As indicated, and can be ascertained from the above referenced U.S. Pat. No. 4,655,897, an electrophoretic display has extremely high resolution and such displays have been developed which are greater than 8½ inch by 11 inch in area. See also a copending application entitled "ELECTROPHORETIC DISPLAY PANEL APPARATUS AND METHODS THEREFOR" filed on Nov. 19, 1985, Ser. No. 799,458 for Frank J. DiSanto et al. and assigned to the assignee herein. Hence, the amount of data, as well as the resolution, can accommodate information of all sorts.

Thus, as can be ascertained from the above, the electrophoretic display, which has been described in U.S. Pat. No. 4,655,897, is a high resolution display which does not require power for refreshing or storing data therein once the data is written. Essentially, by utilizing such a display, one can now generate a visual presentation of a telephone keyboard to enable a user to dial any desired number in conjunction with a position sensitive transparent overlay. It is, of course, understood that the keyboard format can be changed according to the desires of a user. Furthermore, by the use of such a high resolution display the telephone subset is now capable of storing a great many telephone numbers which can be displayed in terms of pages, for example, perhaps 10 or 50 telephone numbers on each page. The entire memory storage contents can be displayed and employed in conjunction with a movable cursor. In this manner, the subscriber can now see each telephone number stored in memory and also knows the entity to which the telephone number belongs. By moving the cursor he can now select the telephone number he wishes to access and by merely pressing one of the subset keys can dial that number without ever accessing the displayed keyboard mode. In this way the subscriber does not have to provide any individual or separate record of stored telephone numbers as is implemented in present day conventional telephone systems.

The entire mechanism for operating in the directory mode is again implemented by pressing a mode key associated with the mode selector 26. In this manner the mode selector 26, for example, upon the depression of subset switch 15, will again inform the microprocessor 25 that it is desired to display all telephone numbers stored in memory. The microprocessor 25 will then access the RAM 28 or ROM 27 and cause the stored data, indicative of stored telephone numbers, to be presented to the keyboard display 30 which is also under control of the microprocessor. The keyboard display 30 generates the various alphanumeric characters as including a character generator which will convert the stored digital data into analog numerals, as is well known in the prior art, and hence display telephone numbers on the electrophoretic display 11.

At the same time a cursor is generated, which cursor can be moved along the directory display (FIG. 5) by means of additional subset buttons or keys. The cursor can be moved in an up or down direction as, for example, the cursor on a computer screen. Techniques for moving cursors to any location are well known. When the cursor is adjacent a desired number the user then merely presses a dial number key on the subset and the telephone number that the cursor is next to or aligned with, as shown in FIG. 5, is automatically dialed.

Figure 5:
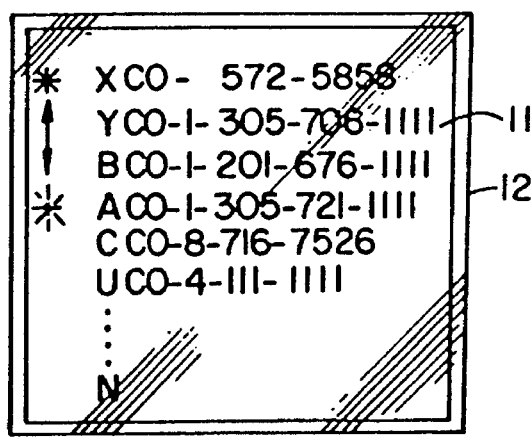
FIG. 5 is a diagram depicting another type of display which canoe employed with this invention.

The above-noted techniques can be simply implemented by means of conventional programming and one skilled in the art should have absolutely no difficulty in displaying such stored numbers as, for example, according to the format depicted in FIG. 5. It is, of course, understood that many modern telephone sets have the ability to store numbers and the numbers stored, which for example may be 10 or more numbers, can be accessed and displayed directly on a single line LCD display or other type of display associated with present day telephone subsets.

The telephone subset of FIG. 1 also has an additional button or key which may be, for example, button 19. By pressing button 19 the telephone is now operated in a proprietary manner. For example, by depressing display button 19 the following sequence of events occur. The depression of button 19 informs the mode selector 26 to prompt the microprocessor 25 that a request is made to implement the generation of a keyboard display. The telephone user then dials in a four digit number, which is like a PIN number, as the same type of number as employed in conjunction with cash machines or credit card systems. The computer 25 compares the dialed in PIN number with a previously stored number and will indicate that the subscriber has access to confidential information contained in given memory locations of the read only memory 27. This information, for example, would present, on the display 11, all credit card numbers which belong to the possessor of the secret code. This will, therefore, enable the user to place calls to enable him to order various goods by means of the telephone subset 10. In any event, he is provided with a separate display contained in a separate memory location of all his credit card numbers.

The display also includes pertinent telephone numbers associated with those credit cards. For example, the number which he can call in regard to a missing or lost credit card, and so on. This data is easily stored in memory and, again, is accessible by means of the same techniques as described above.

Certain other features are immediately apparent and can be implemented with the exact circuitry shown in FIG. 4. For example, the above-noted system lends itself to furnishing a privacy phone lock. The operation would be as follows. With the handset 14 on hook, as shown in FIG. 1, the unit displays a simple array of characters which is not a keyboard format. These characters are stored in a reserved memory block and, essentially, are displayed on the electrophoretic display each time the handset is on hook. The electrophoretic display consumes no power once an array is written on the display. The user then must take the phone off hook and select a proper code via the characters displayed in the array to obtain a dial tone. Once the proper code is entered, a dial tone will be provided and the telephone keyboard display will be properly displayed. Otherwise no line connection can be made and one could not access the telephone line without having access to the code which may be implemented by means of the simple array of characters displayed on the display 11 when the hand set 14 is on hook.

It is, of course, understood that based on conventional techniques the telephone display 11 can also store and display a history of telephone usage, for example, the user code, the number dialed, the data, the time, the length of the call and so on. These techniques are, of course, incorporated in presently available commercial equipment, as well as being extensively described in the prior art.

Hence, it should be apparent to one skilled in the art that the provision of a high resolution display in conjunction with a telephone subset will provide many advantageous modes of operation which modes should be, as described above, understood by those skilled in the art.

Figure 7:
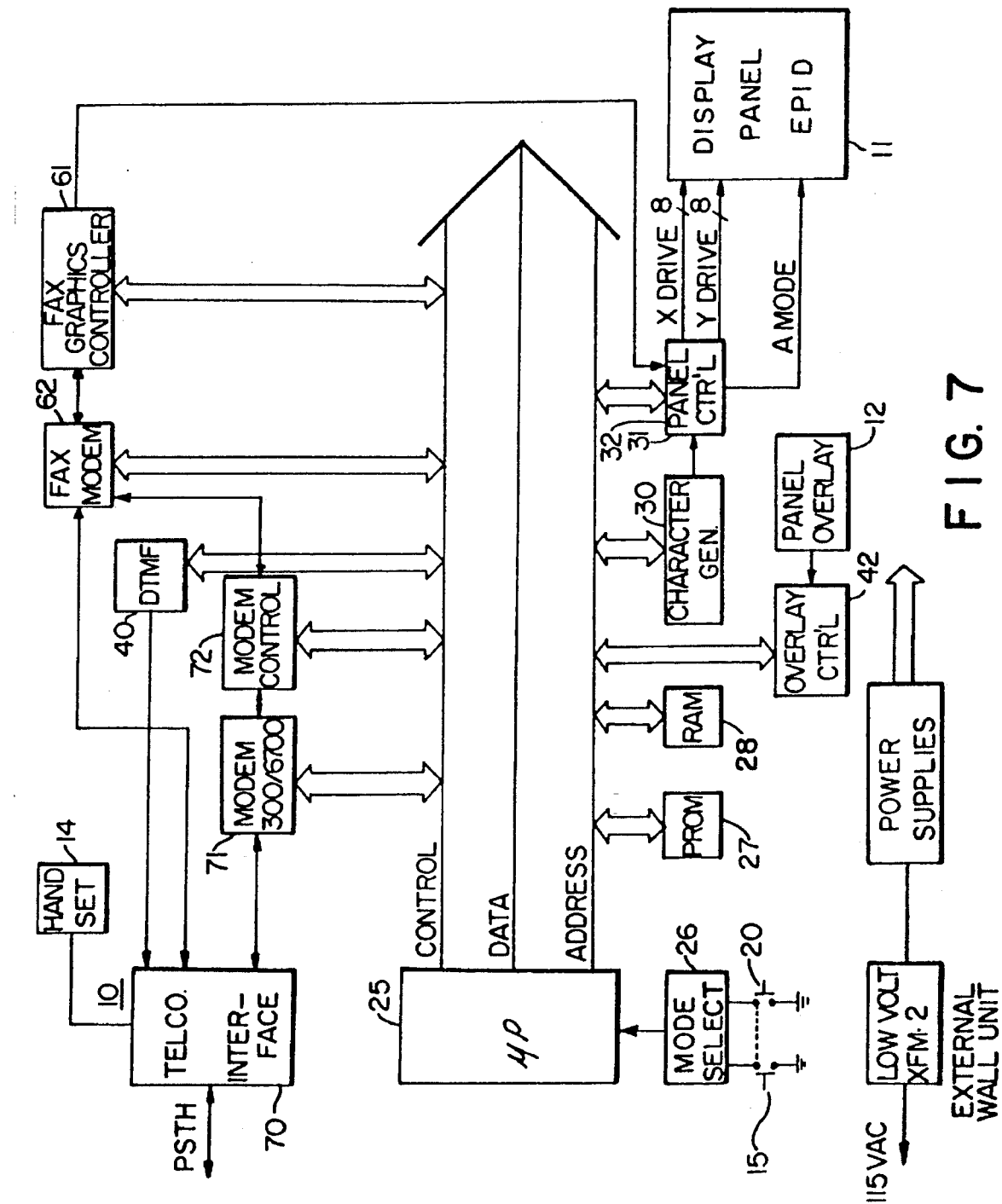
FIG. 7 is a system schematic diagram showing the use of the telephone subset in both a data and telephone mode.

Referring to FIG. 7 there is shown a detailed block diagram showing a telephone subset 10, as described above, employing an electrophoretic display panel 11 which is employed for data and graphics display. It is immediately noted that FIG. 7 retains the same reference numerals as previously described in conjunction with the above-noted figures. For example, in FIG. 7, there is shown the electrophoretic panel 11 which is coupled to X drive and Y drive circuits via panel control module designated as 31 and 32. The panel control is analogous to controls 31 and 32 of FIG. 4. As seen, the panel control is also coupled to a character generator 30 which essentially is coupled to the microprocessor 25 via a bidirectional address bus. Character generators for converting digital data into alphanumeric characters are also well known, as indicated in conjunction with FIG. 4, and can be implemented by the programming of the microprocessor 25.

Also shown is the overlay control designated by numeral 42. Essentially, as indicated, the overlay, which may be a pressure sensitive or other type of overlay, is coupled directly to a dial or DTMF generator 40 (FIG. 6). This again can be implemented by microprocessor programming. The overlay control 40 is also associated with additional circuitry for operating in different modes. As one can ascertain, the mode selector 26 will select and inform the microprocessor in regard to the mode of operation and interfaces with the microprocessor, as shown in FIG. 7, as controlled by means of the subset switches, as 15–20 of FIG. 1. Also shown is the PROM or ROM 27 and the RAM 28.

In any event, as indicated above, the entire subset normally interfaces with a conventional telephone line designated (PSTH) by means of a telephone interface 70, which is shown coupled to the handset 14 as part of subset 10. The telephone interface may include the remaining telephone circuitry, as well as various other registers and so on for data operation.

As seen, the entire unit is associated with a separate facsimile modem 62 which is one of many different types of available modems capable of receiving various types of facsimile transmissions, such as groups I, II, III. Such modems for converting facsimile transmissions into graphic data are well known and coupled to the fax modem 62 is a fax graphics controller 61 which converts the facsimile transmissions into suitable graphics to be applied to the panel control circuit 31 and then displayed directly on the panel 11 associated with the subset. Also shown is a modem control module 72 which is coupled to the fax modem 62 and which receives instructions from the control bus of the microprocessor 25 to enable proper operation. There is a modem selector 71 which essentially is a conventional component and which determines the exact nature of the facsimile transmission to allow proper decoding.

Hence, as shown in FIG. 7, and as above described, telephone apparatus can operate as a complete data subset whereby facsimile messages can be displayed directly on the display 11 and, for example, such a display can accommodate 500 or more lines of individual graphics, employing conventional facsimile modules and modems. In this manner the entire subset, based on its use in conjunction with a high resolution display, has great capabilities and versatilities as should be apparent to those skilled in the art when reviewing the above-noted specification.

We claim:

1. A telephone subset apparatus, comprising:
    a telephone subset including a housing having a telephone handset coupled thereto;
    an electrophoretic display panel mounted on said housing for displaying graphic data;
    microprocessor means coupled to said display panel for preventing an unauthorized person from viewing from a remote location a number dialed from by a user;
    a facsimile reception means, coupled to said microprocessor means, for receiving a facsimile transmission, said microprocessor means operative to convert the received facsimile transmission into graphics data to be displayed on said display panel; and
    position sensitive means operative to produce a telephone number output signal as dialed by the user employing a random keyboard presentation as a guide for selecting said signal, said random keyboard presentation being randomly selected from stored data indicative of various graphic keyboard presentations.

2. A telephone subset apparatus for use in providing high quality graphics displays from a facsimile transmission, comprising;
    a telephone subset including a housing having a telephone handset coupled thereto;
    a high resolution electrophoretic display panel means mounted on a top surface of said housing which is accessed by an X-Y addressing means to display graphic data thereon;
    microprocessor means operative to enable said display means to provide a graphics display and including random keyboard means for providing a substantially random graphic telephone keyboard presentation on said display panel means for preventing an unauthorized person from viewing from a remote location a number dialed by a user, said random keyboard means including first storage means coupled thereto and operative to store data indicative of various graphic keyboard presentations to enable a user to dial a telephone number based on any randomly selected one of said keyboard presentations; and
    interface means coupled to said display panel means for coupling said display panel means to a telephone line, said interface means including a position sensitive means responsive to a user-indicated position on said high resolution display panel means for selecting a desired combination of numbers on said substantially random keyboard presentation, a dialing generator coupled to said position sensitive means and operative to provide telephone dialing signals to said to said telephone line, a fax modem for receiving a facsimile transmission on said telephone line and a modem control module coupled to said fax modem and adapted to receive instructions from said microprocessor and enable the facsimile transmission to be applied directly to said display panel means.

3. The apparatus according to claim 2, wherein said interface means includes:

a fax graphics controller coupled to said fax modem for converting received a facsimile transmission into graphics data to be applied to said display panel means; and a panel control module, including an X-Y addressing means, coupled to said fax graphics controller and to said display panel means for receiving said graphics data from said fax graphics controller and controlling the X-Y addressing means for addressing said display panel means in order to provide a graphics display thereon corresponding to the facsimile transmission.

4. A telephone subset apparatus for use in providing high quality graphics displays from a facsimile transmission, comprising:

a telephone subset including a housing having a telephone handset coupled thereto;

a high resolution electrophoretic display panel mounted on a top surface of said housing and capable of being accessed by an X-Y addressing means to display graphic data thereon;

microprocessor means operative to enable said display panel means to provide a graphics display; and interface means coupled to said display panel means for coupling said display panel means to a telephone line;

wherein said microprocessor means includes random keyboard means for providing a substantially random graphic keyboard presentation on said display panel means for preventing an unauthorized person from viewing from a remote location a number dialed by a user, said random keyboard means including first storage means coupled thereto and operative to store data indicative of various graphic keyboard presentations to enable a user to dial a telephone number based on any randomly selected one of said keyboard presentations; and wherein said interface means includes:

a telecommunications interface with a telephone line coupled to said telephone subset;

a fax modem coupled to said communications interface for receiving a facsimile transmission on said telephone line;

a modem control module coupled to said fax modem and to control bus of said microprocessor for receiving instructions from said microprocessor to control said fax modem to enable the facsimile transmission to be displayed on said display panel means;

a fax graphics controller coupled to said fax modem and to said control bus of said microprocessor for converting the received facsimile transmission into graphics data and applying said received facsimile transmission directly to said display panel means;

a panel control module, including an X-Y addressing means, coupled to said fax graphics controller and to said display panel means for receiving said graphics data from said fax graphics controller and controlling the X-Y addressing means for addressing said display panel means in order to provide a graphics display thereon corresponding to the facsimile transmission; and a position sensitive means responsive to a user-indicated position on said high resolution display panel means for selecting one of a plurality of stored telephone numbers and a dialing generator coupled to said position sensitive means and operative to provide telephone dialing signals to said telephone line.

5. The telephone subset apparatus according to claim 4, wherein said interface means further includes a modem selector coupled to said telecommunication interface and to said modem control module for determining the nature of the facsimile transmission in order to allow proper decoding thereof.

6. The telephone subset apparatus according to claim 4, wherein said microprocessor means includes a X decoder means coupled to said high resolution display panel means addressed by said microprocessor means to generate X data for said high resolution display panel means and an X decoder means coupled to said high resolution display panel means and addressed by said microprocessor means to generate Y data for said display panel means.

7. The telephone subset apparatus according to claim 6, further including means coupled to said handset and operative to provide a control signal when said handset is lifted off hook.

8. The telephone subset apparatus according to claim 7, including means coupled to said microprocessor means and responsive to said control signal to cause said microprocessor means to generate any one of said various graphic keyboard presentations as stored.

9. The telephone subset apparatus according to claim 4, wherein said interfacer means further includes a dialing generator coupled to said position sensitive means and operative to provide telephone dialing signals to said telephone line.

10. The telephone subset apparatus according to claim 4, further including a plurality of actuatable keys mounted on the top surface of said housing and coupled to a mode selector means included in said microprocessor means for operating said microprocessor means in any one of a plurality of modes according to the selection of an associated key for said mode.

11. The telephone subset apparatus according to claim 10, further including second storage means operative to store therein a plurality of telephone numbers indicative of called parties, said second storage means accessed by a first one of said mode keys to cause said high resolution display panel means to display a first plurality of stored numbers simultaneously thereon, and cursor means associated with said high resolution display panel means and operative to movably align adjacent each number as displayed under control if said user by at least a second one of said keys to enable a user to select any one of said displayed numbers, and means coupled to a third one of said keys to cause the number aligned with said cursor means to be dialed.

12. The telephone subset apparatus according to claim 11, wherein said plurality of numbers as stored are displayed in consecutive display presentations to thereby store a large director of telephone numbers which are displayed in groups of numbers on a page-to-page basis.

13. The telephone subset apparatus according to claim 12, further including third storage means coupled to said microprocessor means and operative to store therein a plurality of credit card numbers associated with a user of said subset and accessible by means of a fourth subset mode key to provide said user with a display indicative of said credit card numbers.

14. The telephone subset apparatus according to claim 13, further including means coupled to said display and operative when said handset is on hook to provide an array of separate characters wherein a user can access said third storage means only by first selecting a given set of characters in said array of separate characters.

15. The telephone subset apparatus according to claim 4, wherein said storage means includes a ROM and a RAM.

16. The telephone subset apparatus according to claim 4, further including means coupled to said display means for generating a display of telephone usage.

17. The telephone subset apparatus according to claim 16, further including ring-back detector means coupled to said telephone line and operative to provide a control signal when a connection is made between said subset and a called party by detecting ring-back, with said detector coupled to said microprocessor means to enable said microprocessor means to ready said subset for the receipt of data from said called party.

18. The telephone subset apparatus according to claim 4, wherein said microprocessor means includes character generator means operative to convert digital data as stored to alpha numeric character data for addressing said high resolution display panel means.

19. The telephone subset apparatus according to claim 4, which further comprises random generator means coupled to said microprocessor means and operative to cause said microprocessor to cause said panel to provide a graphic presentation of a telephone keyboard arrangement which is a substantially random keyboard presentation.

* * * * *